United States Patent
Furukawa et al.

(10) Patent No.: US 7,260,634 B2
(45) Date of Patent: Aug. 21, 2007

(54) STORAGE DEVICE BAND CONTROL APPARATUS, METHOD, AND PROGRAM

(75) Inventors: Hiroshi Furukawa, Sagamihara (JP); Daisuke Shinohara, Yokohama (JP); Kenichi Shimooka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 625 days.

(21) Appl. No.: 10/230,304

(22) Filed: Aug. 29, 2002

(65) Prior Publication Data

US 2004/0010605 A1 Jan. 15, 2004

(30) Foreign Application Priority Data

Jul. 9, 2002 (JP) ............................. 2002-199386

(51) Int. Cl.
*G06F 15/173* (2006.01)
(52) U.S. Cl. ........................ 709/226; 711/4; 711/114
(58) Field of Classification Search ........ 709/223–225, 709/226; 711/4, 114
See application file for complete search history.

(56) References Cited

U.S. PATENT DOCUMENTS

| | | | | |
|---|---|---|---|---|
| 6,732,104 | B1 * | 5/2004 | Weber | 707/10 |
| 6,787,738 | B2 * | 9/2004 | Odorcic et al. | 219/391 |
| 6,832,248 | B1 * | 12/2004 | Byrnes | 709/223 |
| 6,895,485 | B1 * | 5/2005 | DeKoning et al. | 711/170 |
| 6,976,134 | B1 * | 12/2005 | Lolayekar et al. | 711/148 |
| 7,194,538 | B1 * | 3/2007 | Rabe et al. | 709/224 |
| 2002/0049841 | A1 * | 4/2002 | Johnson et al. | 709/225 |
| 2002/0095400 | A1 * | 7/2002 | Johnson et al. | 707/1 |
| 2002/0112030 | A1 * | 8/2002 | Iwami et al. | 709/219 |
| 2002/0194251 | A1 * | 12/2002 | Richter et al. | 709/105 |
| 2002/0194324 | A1 * | 12/2002 | Guha | 709/223 |
| 2003/0074374 | A1 * | 4/2003 | Karibe et al. | 707/104.1 |
| 2003/0079019 | A1 * | 4/2003 | Lolayekar et al. | 709/226 |
| 2003/0097445 | A1 * | 5/2003 | Todd et al. | 709/226 |

FOREIGN PATENT DOCUMENTS

JP 10111761 4/1998

* cited by examiner

*Primary Examiner*—Bunjob Jaroenchonwanit
*Assistant Examiner*—Duyen Doan
(74) *Attorney, Agent, or Firm*—Mattingly, Stanger, Malur & Brundidge, P.C.

(57) ABSTRACT

A network system includes a storage device and a plurality of information devices using storage regions of the storage device, in which the band control information required for performing the network communication band control is created in accordance with the band guarantee requirement information concerning the network communication band guarantee, the configuration information in the storage device and the performance information of the storage device. Furthermore, a band control execution device is instructed to execute the network communication band control in accordance with the band control information.

14 Claims, 6 Drawing Sheets

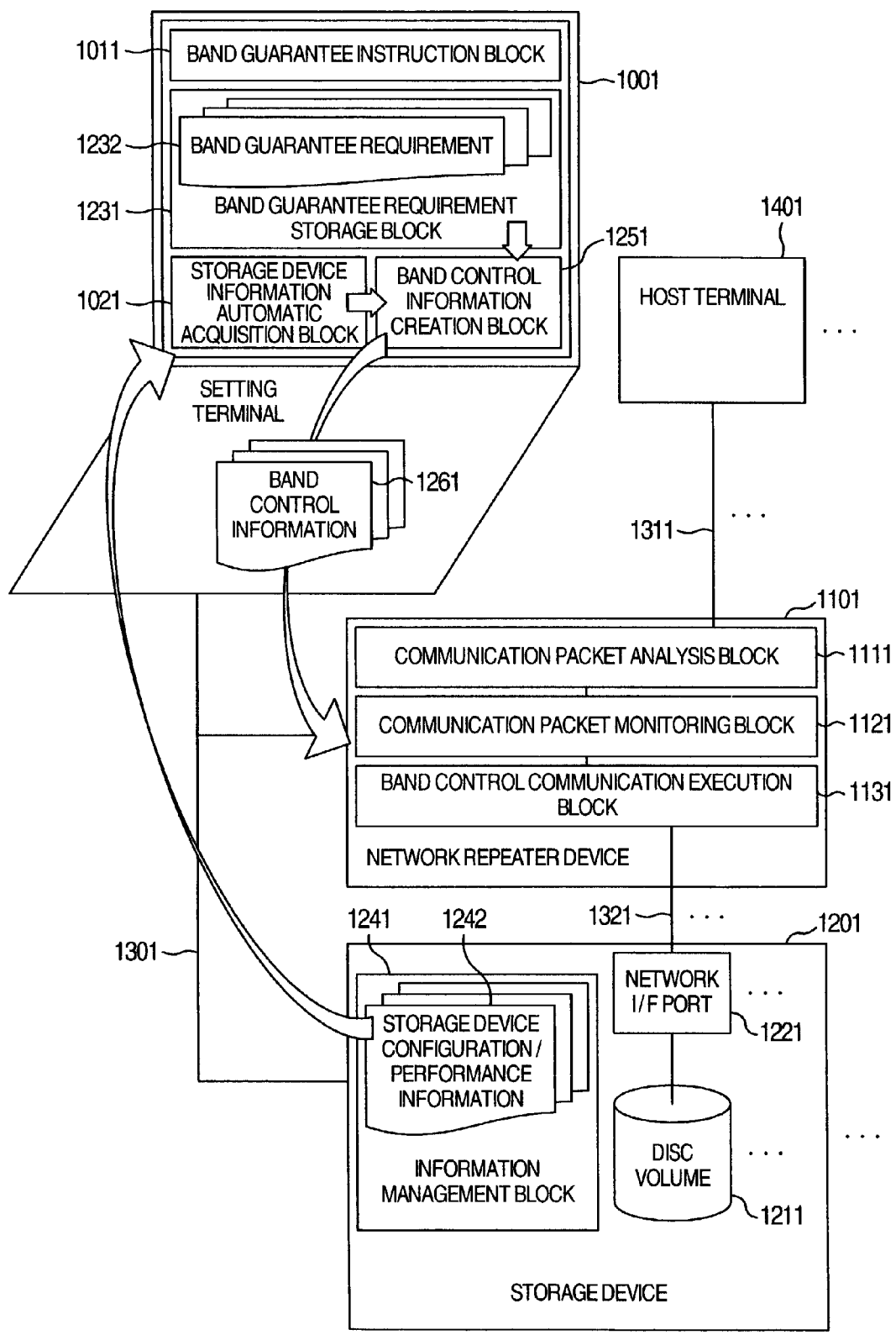

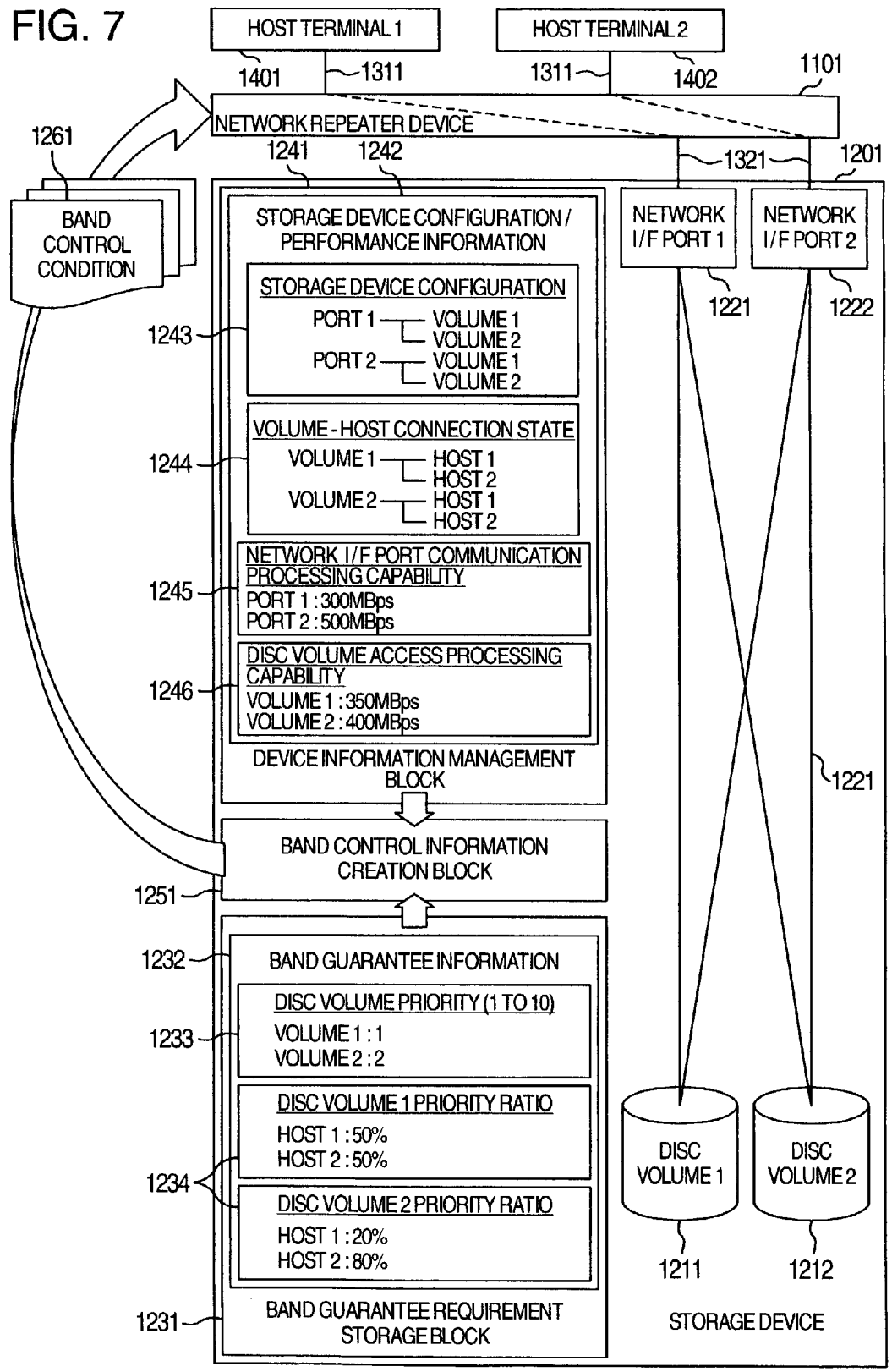

STORAGE DEVICE BAND CONTROL APPARATUS, METHOD, AND PROGRAM

BACKGROUND OF THE INVENTION

The present invention relates to a storage device band control apparatus, a band control program and its method and in particular, to a technique for communication band control of a network including a storage device and a plurality of information apparatuses utilizing the storage device.

Conventionally, there is a band control technique for realizing band guarantee in a network communication.

Normally, when performing the band control, a network manager specifies information for guaranteeing the network communication band such as a particular traffic threshold value and an inter-packet communication priority to a switch controlling the network connection relationship and a network repeater apparatus such as a hub, so that the network repeater apparatus performs scheduling of a packet to be transmitted and a limit of communication amount by discarding a particular packet in accordance with the specified band guarantee requirement information and a monitor result.

It should be noted that it is also possible to perform the network communication band control by that the communication packet itself includes the aforementioned band guarantee requirement information.

On the other hand, recently, with improvement of the network performance and increase of the data size used by various applications, there arises a product and technique that a large-size storage device is directly connected to a network such as SAN (storage area network) so as to be used as a storage region. A storage device connected to the network normally consists of network I/F ports which are connectors with the network and a disc volume group as a storage region connected to the ports. The ports and the disc volumes can be freely configured as multiple ports against multiple disc volumes.

The aforementioned band control for the network is to perform band guarantee in accordance with the communication traffic and the information device connection relationships in the network, and not to realize the band guarantee in accordance with the internal configuration of the information device in the network and the performance value measured in the network. On the other hand, in the storage device, each of the ports and each of the disc volumes also have a performance limit as a processing capability.

Accordingly, due to a bottle neck generated by the performance limit of the storage device or the components in the storage device, there is a case that the network communication band cannot be guaranteed.

SUMMARY OF THE INVENTION

It is therefore an object of the present invention to guarantee control of the communication band in a network system including a storage device and a plurality of information devices using storage regions of the storage device.

A network system according to an embodiment of the present invention is connected to a storage device and a plurality of information devices using the storage region and creates band control information required for performing network communication band control in accordance with band guarantee requirement information related to the network communication band guarantee, configuration information in the storage device and performance information of the storage device. Furthermore, a band control execution apparatus is instructed so as to execute the network communication band control in accordance with the band control information.

Moreover, in the network system according to this embodiment, the band control instruction apparatus preferably has an acquisition block for acquiring configuration information in the storage device and performance information of the storage device.

Moreover, in the network system according to this embodiment, a band setting apparatus preferably has a judgment block for judging whether the band control executed by the network follows the band guarantee requirement information and if not following, instructing the band control information creation block to create band control information.

Moreover, in the network system according to this embodiment, a band control information creation block of the band setting apparatus preferably creates band control information when the configuration in the storage device or the network connection relationship is modified.

Other objects, features and advantages of the invention will become apparent from the following description of the embodiments of the invention taken in conjunction with the accompanying drawings.

BRIEF DESCRIPTION OF THE DRAWINGS

FIG. 6 shows configuration for realizing the band guarantee according to a second embodiment.

FIG. 7 shows a network configuration explaining a procedure for creating band control information.

DESCRIPTION OF THE EMBODIMENTS

Figure 1:
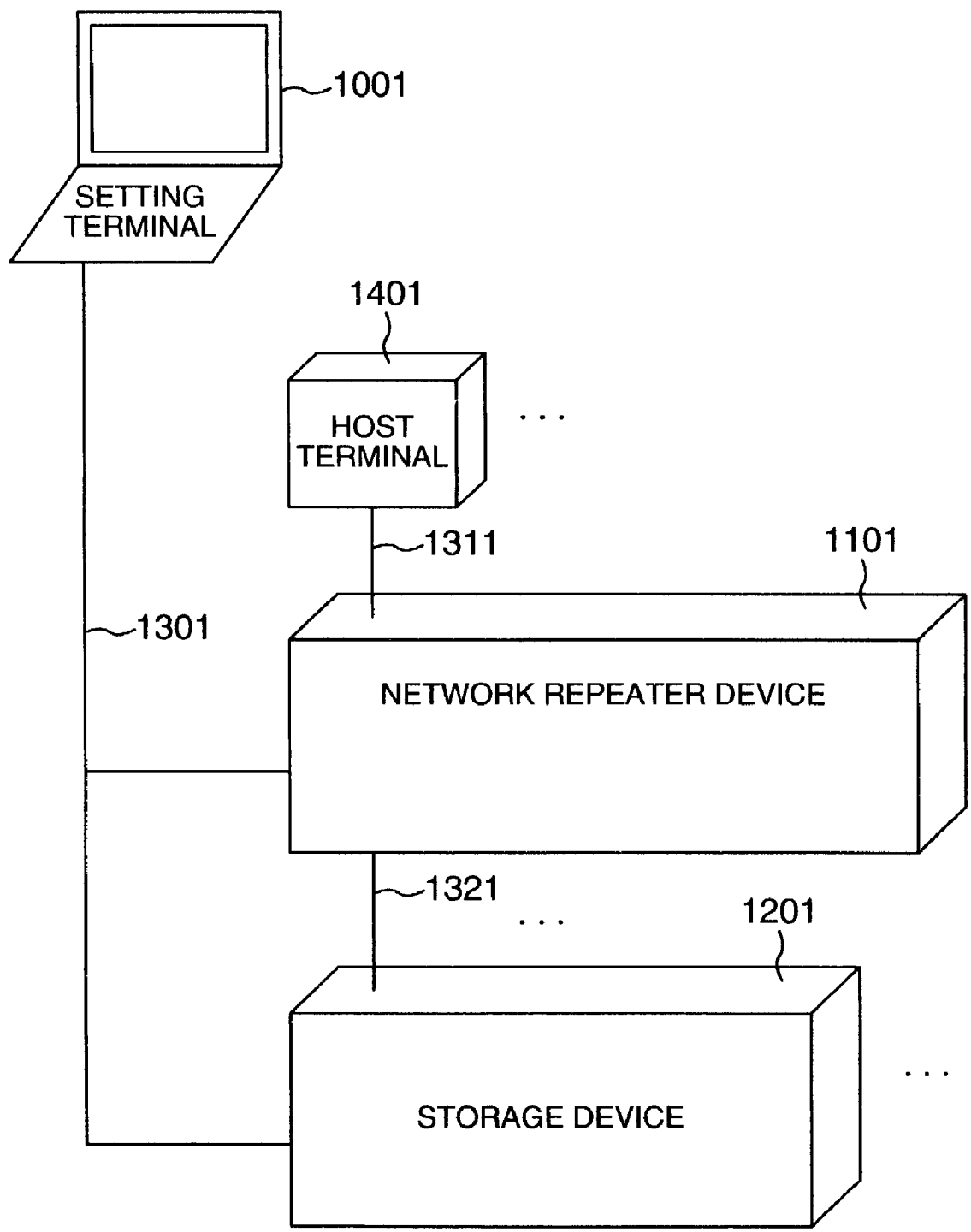
FIG. 1 shows a system configuration according to an embodiment of the present invention.

FIG. 1 is a network configuration diagram showing a network system configuration according to an embodiment of the present invention.

1001 is a setting terminal, 1101 is a network repeater device, 1201 is a storage device, 1401 is a host terminal, 1301 is a network for setting, 1311 is a network for connecting the host terminal 1401 to the network repeater device 1101, and 1321 is a network connecting the storage device 1201 to the network repeater device 1101. It should be noted that in this figure, for simplification of explanation, it is assumed that the number of each of the components is one, but each of the components may be a multiple number.

The setting terminal 1001 is an information device for a network manager for creating band control information required for performing band guarantee in communication between the host terminal 1401 and the storage device 1201 and instructing the network repeater device 1101 to perform communication band control in accordance with the band control information.

The network repeater device 1101 is a device for relaying communication between the network 1311 and the network 1321 and if necessary, realizes band guarantee in communication between the host terminal 1401 and the network connection type storage 1201. The network repeater device 1101 may be, for example, a router and a switch (fiber channel switch, IP switch).

The storage device 1201 is connected to the network 1321 and has a storage region used by an application and an operating system operating on the host terminal 1401. The storage device 1201 may be, for example, an SAN storage device and an NAS (Network Attached Storage) storage device.

The host terminal 1401 is an information device using the storage device 1201 as a storage region via the network. The host terminal 1401 may be, for example, an SAN host computer and an NAS client computer.

The setting network 1301, the networks 1311 and 1321 may be, for example, a fiber channel and LAN.

In the present invention, in communication between the storage region existing in the storage device 1201 and the host terminal 1401 using it, the band guarantee is realized by using the band guarantee technique of the network repeater device 1101. Means and configuration for realizing the band guarantee will be detailed below.

Figure 2:
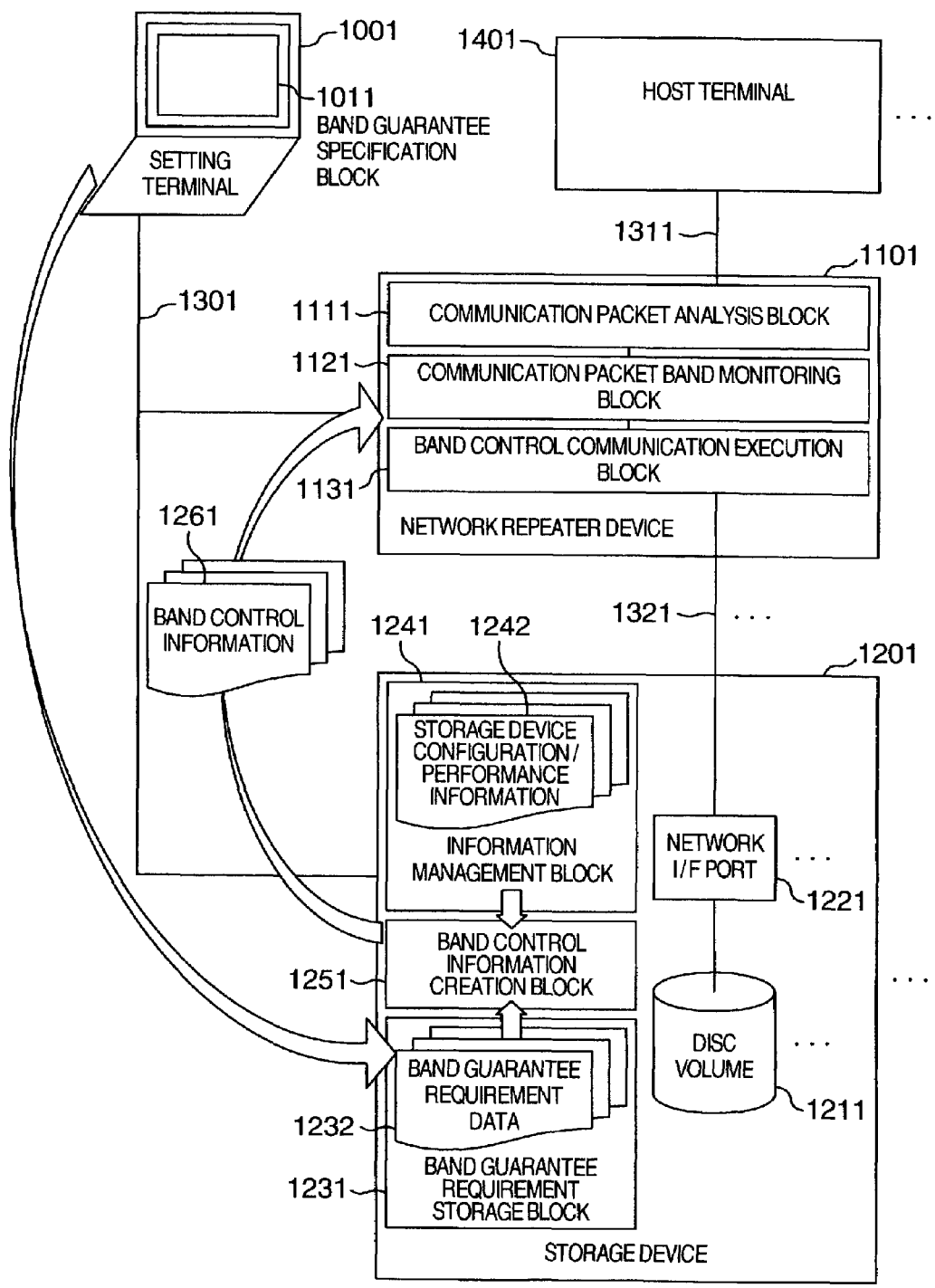
FIG. 2 shows configuration for realizing a band guarantee according to a first embodiment.

FIG. 2 shows network configuration in the first embodiment of the present invention.

The setting terminal 1001 has a band guarantee specification block 1011 for accepting information specified for the communication band guarantee by the network manager.

The network repeater device 1101 has a communication packet analysis block 1111, a communication packet band monitoring block 1121, and a band control communication execution block 1131.

The storage device 1201 has a disc volume 1211, a network I/F (interface) port 1221, a band guarantee requirement storage block 1231 containing the band guarantee requirement data 1232, a storage device information management block 1241 containing the storage device configuration/performance information data 1242, and a band control information creation block 12151 for creating band control information 1261.

It should be noted that a program for causing the respective components of the storage device 1201 to function is recorded in a recording medium such as a CD-ROM and stored on a magnetic disc or the like so as to loaded in memory to be executed. It should be noted that the medium recording the program may be a recording medium other than the CD-ROM. Moreover, the program may be installed from the storage medium to the storage device 1201 or the program may be used by accessing the recording medium via the network.

It should be noted that the band guarantee requirement storage block 1231 or the storage device information management block 1241 may be arranged in a memory and a buffer in the storage device 1201 as well as on a disc. Moreover, in this figure, for simplification of explanation, only one disc volume 1211 and one network I/F port 1221 are explained. However, actually, a plurality of disc volumes 1211 and network I/F ports 1221 may be included. That is, the disc volume 1211 and the network I/F port 1221 are explained as one to one relationship but in the actual device, it is possible to constitute a multiple to multiple relationship.

The band guarantee specification block 1011 accepts band guarantee requirement information related to the communication band guarantee specified by the manager via the setting screen. The band guarantee specification block 1011 transmits the accepted band guarantee requirement information to the storage device 1201 via the setting network 1301. The storage device 1201 stores the band guarantee requirement information accepted as the band guarantee requirement data 1232 in the band guarantee requirement storage block 1231. Here, the band guarantee requirement data 1232 is, for example, information indicating priority of each disc volume 1211 among the plurality of disc volumes 1211 of the storage device 1201 and priority ratio of each host terminal 1401 among the plurality of host terminals 1401. Here, the disc volume 1211 is a set of data storage regions and may be a physical unit or a logical unit.

Figure 3:
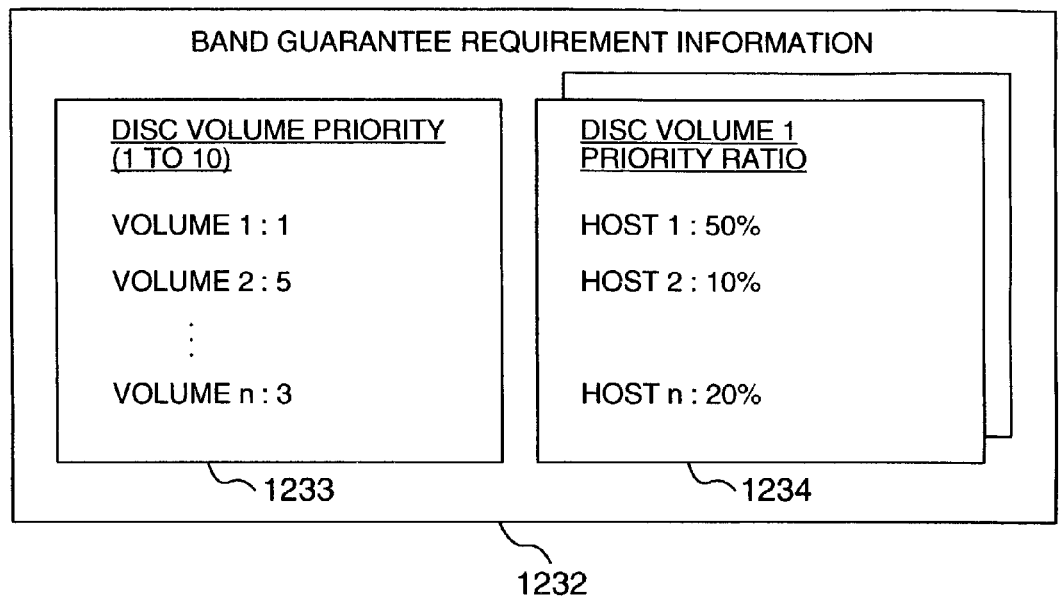
FIG. 3 shows an example of band guarantee requirement data.

FIG. 3 shows an example of the band guarantee requirement data 1232 stored in the storage device.

The band guarantee requirement data 1232 consists of data 1233 indicating priority of each disc volume 1211 and data 1234 indicating priority ratio of the host terminal 1401 for each of the disc volumes 1211. It should be noted that the band guarantee requirement data 1232 of the present embodiment includes display examples 1233 and 1234. The data format may be any if the data is one defining priority relationship between the disc volumes 1211 and one defining priority relationship of the host terminals 1401 used by the disc volumes 1211.

In the storage device information management block 1241, configuration information 1242a in the storage device and performance information 1242b of the storage device are recorded. The configuration information 1242a in the storage device, for example, includes information on connection relationship between the disc volume 1211 and the network I/F port 1221 and information on connection relationship between the disc volume 1211 and the host terminal using it. Moreover, the performance information 1242b of the storage device, for example, is a measurement amount of a communication amount of the disc volume accessed per unit time and a measurement amount of a communication amount of the network I/F port accessed per unit time. Here, the configuration information 1242a in the storage device is collected/updated by the storage device 1201 at the timing specified by the setter via the specification terminal 1011 or periodically, so that the latest information in the storage device is held.

Figure 4:
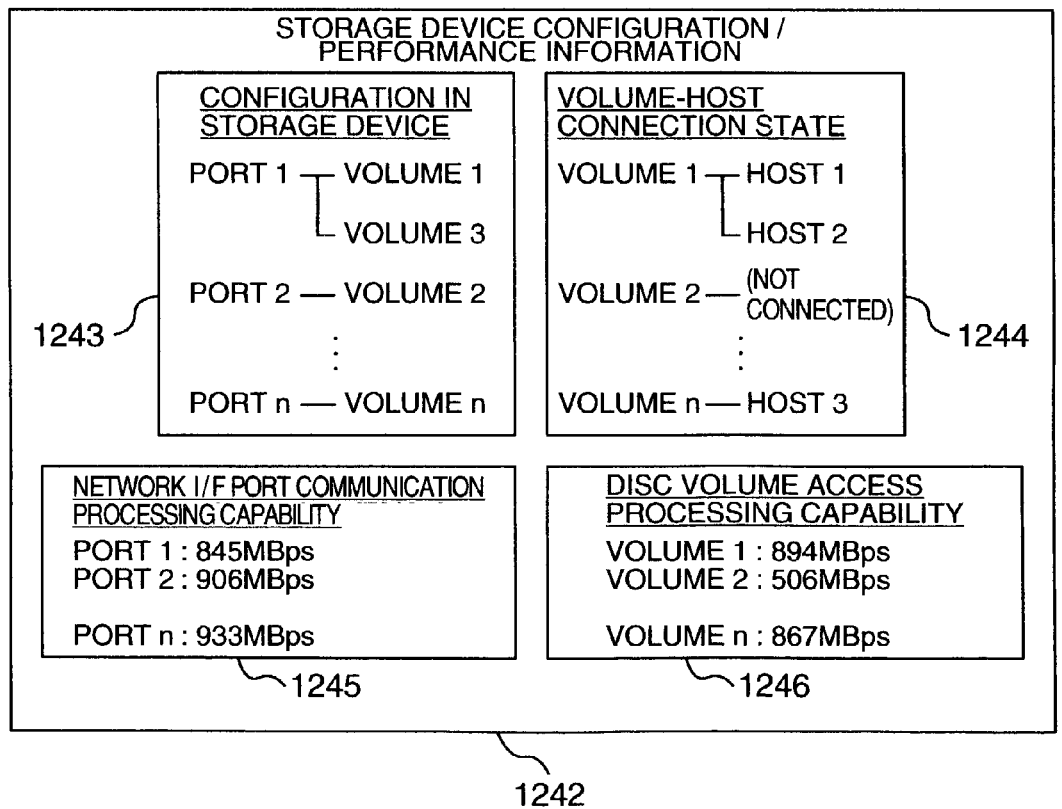
FIG. 4 shows an example of storage device configuration/performance information data.

FIG. 4 shows an example of storage device configuration/performance information data 1242 stored in the information management block 1241 of the storage device.

The storage device configuration/performance information data 1242 consists of the configuration information 1242a in the storage device and performance information 1242b of the storage device. The configuration information 1242a in the storage device includes information 1243 on the connection relationship between the disc volume 1211 in the storage device 1201 and the network I/F port 1221 and data 1244 on the connection relationship between the disc volume 1211 in the storage device 1201 and the host 1401 which uses it. Moreover, the performance information 1242b of the storage device includes a communication processing performance value 1245 in the network I/F port 1221 and an access processing performance value 1246 in the disc volume 1211. It should be noted that the access processing performance value 1246 in the disc volume 1211 may be an access performance including the performance of a buffer when one is provided between the network I/F port 1221 and the disc volume 1211.

Here, the communication processing performance value 1245 and the access processing performance value 1246 are values actually measured by an acquisition block (not depicted) in the storage device 1201 and are periodically updated by using the timer function provided in the storage device 1201. It should be noted that in this figure, display examples 1243, 1244, 1245, 1246 are shown. Their formats may be any if they include data on the connection relationship between the disc volume 1211 and the network I/F port 1221 and between the disc volume 1211 and the host 1401 and data on a performance value measured concerning the band control of the disc volume 1211 in the storage device 1201 and the network I/F port 1221. It should be noted that the communication processing performance value 1245 in the network I/F port 1221 may be a communication packet size, a communication delay ration, and a packet loss ratio in addition to a communication traffic amount. The access processing performance value 1246 in the disc volume 1211 may be I/O related statistical information including an I/O error and volume operation ratio in addition to the disc volume access performance.

Explanation will be given on the function executed by the band control information creation block 1251. The function of the band control information creation block 1251 can execute firmware, application program operated by the control block in the storage device 1201.

The band control information creation block 1251 creates band control information 1261 between the host terminal 1401 and the disc volume 1211 to be set in the network repeater device 1101 in accordance with the band guarantee requirement data 1232 and the storage device configuration/performance information data 1242.

The band control information creation block 1251 transmits the created band control information 1261 via the setting network 1301 by the setting interface of the storage device 1201 to the network repeater device 1101. The network repeater device 1101 realizes band control between the host terminal 1401 and the disc volume 1211 by executing the band control function which will be detailed later.

Moreover, the band control information creation block 1251 checks whether the band control function set in the network repeater device 1101 follows the band guarantee requirement data 1232 at timing more often than the timing that the performance information in the storage device configuration/performance information data 1242 is periodically updated or the performance information is periodically updated.

With reference to FIG. 7, explanation will be given on the procedure of creating the band control information 1261 by the band control information creation block 1251. Here, in the network configuration as shown in FIG. 7, band control is executed between the storage devices 1201 having the host terminals 1401, 1402 and the disc volumes 1211, 1212. For example, it is assumed that in the band guarantee requirement data 1232, information 1233 has priority 1 of the disc volume 1 and priority 2 of the disc volume 2, information 1234 has priority ratio of 50% of the first host 1401 and 50% of the second host 1202 against the first disc volume 1201, and priority ratio of 20% of the first host 1401 and 80% of the second host 1402 against the second disc volume 1212.

In this case, the band control requirement obtained from the band guarantee requirement data 1232 is $(50/100) \times ((3-1)/3) = 1/3$ of the entire band between the first host 1401 and the first disc volume 1211. Similarly, $1/15$ between the first host 1401 and the second disc volume 1212, $1/3$ between the second host 1402 and the first disc volume 1211, and $4/15$ between the second host 1402 and the second volume 1212. Moreover, the band control requirement between the first host 1401 and the first network I/F port 1221 is $(1/3)+(1/15) = 2/5$, and $3/5$ between the second host 1402 and the second network I/F port 1221.

The communication performance of the network I/F port 1245 and the access performance of the disc volume 1246 in the storage device configuration/performance information data 1242 may be matched with the aforementioned calculated expected processing performance ratio but in the actual system, the actual band control set is usually different from the expected performance ratio due to various factors such as performance limit of hardware itself, protocol collision on the network, packet loss, and the like.

For example, the value actually measured as the performance value is assumed to be the data shown by 1245 and 1246 in FIG. 7. The communication processing performance of each network I/F port expected is calculated as follows: the first network I/F port 1221 is $800 \times (1/3+1/15) = 320$ MBps and the second network I/F port 1222 is 480 MBps because the total of the communication processing performance of the network I/F port is 800 MBps. Moreover, the access processing performance of each disc volume expected is calculated as follows: the first disc volume 1211 is $750 \times (1/3+1/3) = 500$ MBps and the second disc volume 1212 is 250 MBps since the total of the access performance of the entire disc volume is 750 MBps. Furthermore, in accordance with the aforementioned disc volume performance, the communication processing performance in each network I/F port which can be processed by the disc volume is calculated as follows: in the first network I/F port, $500 \times 1/2 + 250 \times 1/5 = 300$ MBps and in the second network I/F port, 450 MBps. These values are lower than the communication processing performance of each network I/F port calculated above. That is, the disc volume access processing performance as the expected value is lower than the communication processing performance value of the network I/F port. In order to perform band guarantee without bottle neck as a system, it is necessary to set a control condition matched with the access performance of the disc volume which is a farther lower processing performance value. Of course, on the contrary, when the communication processing performance value of the network I/F port is lower than the disc access processing performance, the band is assured by matching with the communication processing performance value of the network I/F port.

Firstly, based on the aforementioned values, the band control information creation block 1251 creates as network repeater device band control information 1261 information such as queue control processing to limit packets exceeding 300 MBps between the first host 1401 and the first network I/F port 1221 and packets exceeding 450 MBps from the second host 1402 to the second network I/F port 1222, and sets the information in the network repeater device 1101.

By the aforementioned condition set, the next performance value actually measured about the network I/F port and the disc volume is changed and if matched with the expected performance value, the control condition is satisfied. However, as has been described above, since the performance value varies depending on various conditions, the control condition is again calculated based on the value re-measured and the control condition is modified and adjusted. It should be noted that the final actual measurement value is rarely matched with the expected value and accordingly, a threshold value is used for internal judgment and when the actual measurement value has entered several percents of error of the expected value, it is judged that the control condition is matched. The threshold value may have information as internal judgment in advance or a setting person may enter information as band control requirement.

It should be noted that the creation method and judgment method explained in FIG. 7 are only examples and creation and judgment may also be performed in accordance with the aforementioned performance information.

In FIG. 2, the communication packet analysis block 1111, the communication packet band monitoring block 1121, and the band control communication execution block 1131 in the network repeater device 1101 realize the band guarantee control function of the communication relaying from the network 1131 to the network 1321. Hereinafter, explanation will be given on the processing of the band control.

Firstly, the communication packet analysis block analyzes header contents and data contents of the communication packets flowing on the network and classifies the packets by a combination of a transmission origin address, a destination address, and a protocol type. Next, the communication packet band monitoring block 1121 monitors the classified packets in accordance with the band control information such as a predetermined traffic and packet processing priority. When the condition is satisfies in the aforementioned monitoring, lastly, the band control communication execution block 1131 controls packet transmission processing by queue control processing and scheduler processing, and if necessary, discarding packets exceeding the requested processing.

Figure 5:
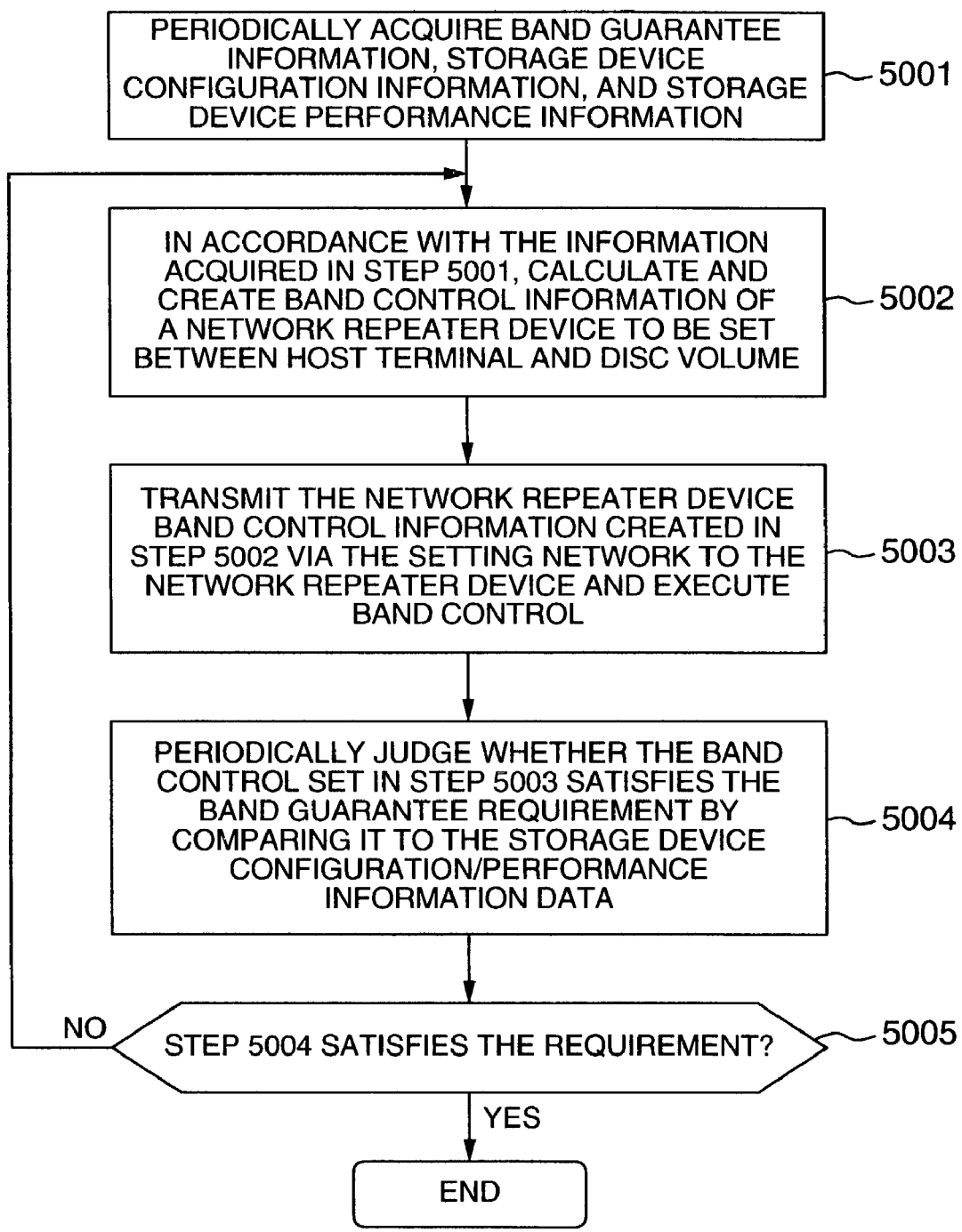
FIG. 5 shows a flow of setting/adjustment processing related to the band control in the first embodiment of the present invention.

FIG. 5 is a flowchart of creation of the band control information 1261 by the storage device 1201 and executing setting of the band control by the network repeater device 1101.

Firstly, the band control information creation block 1251 periodically acquires the band guarantee requirement information 1232 and the storage device configuration/performance information data 1242 by the timer in the storage device 1201, and stores them (step 5001). It should be noted that the periodic timing is identical to a timing for acquiring ordinary performance statistical information and the acquisition is normally performed every several seconds. However, this is only a standard and the acquisition timing may be at any timing depending on the system if longer than the timing for acquiring the performance statistical value.

In accordance with the information acquired in step 5001, the band control information creation block 1251 calculates a band control condition of the network repeater device 1101 to be set between the host terminal 1401 and the disc volume 1211, and creates the band control information 1261 (step 5002).

An example of condition calculated in step 5002 corresponds to the aforementioned description of the FIG. 7. That is, by combining the storage device configuration/performance information data 1242 updated at a periodical timing and the band guarantee requirement information 1232, a band control condition based on the performance value expected is created.

The band control information creation block 1251 transmits the band control information 1261 created in step 5002 to the network repeater device 1101 via the setting network 1301. In accordance with the band control information 1261, the network repeater device 1101 executes band control between the host terminal 1401 and the disc volume 1211 (step 5003).

The band control method of the network repeater device 1101 in step 5003 follows the processing explained for the band control processing by the network repeater device 1101 in FIG. 2. It should be noted that processing blocks executing the band control processing of the network repeater device 1101 (the communication packet analysis block 1111, the communication packet band monitoring block 1121, and the band control communication execution block 1131) are realized by firmware, application program operated on a memory in the network repeater device 1101.

When acquiring the performance information as explained with FIG. 2, the band control information creation block 1251 judges whether the band control set in step 5003 satisfies the band guarantee requirement information 1232 by comparing it to the storage device configuration/performance information data 1242 (step 5004). The band control information creation block 1251 may perform the judgment with cycle longer than the above-mentioned cycle for acquiring the performance information.

An example of condition judged in step 5004 corresponds to the aforementioned description of FIG. 7. That is, the storage device configuration/performance information data 1242 updated at a periodical timing is compared to the band control requirement information 1232 and it is determined whether a difference between the expected performance value created from the control requirement and a performance value actually measured is within a predetermined threshold value.

Unless the requirement is satisfied in step 5004, control is returned to step 5002 and a processing to be set between the host terminal 1401 and the disc volume 1211 is repeated again. On the contrary, when the condition is satisfied in step 5004, the processing is terminated (step 5005).

It should be noted that although not described in this processing, if internal configuration has been modified in the storage device 1201 before the judgment in step 5005, the storage device configuration/performance information data 1242 which is a judgment requirement to be compared in step 5005 has also been modified and control is returned to step 5002 so as to again calculate the band control condition of the network repeater device 1101 to be set between the host terminal 1401 and the disc volume 1211. Moreover, instead of performing step 5004 and step 5005, the following can be performed. When the performance value measured from time to time exceeds a threshold value having an actually measured performance value required for satisfying the band control information, it is assumed that the requirement is not satisfied and control is returned to step 5002 so as to again repeat the processing to be set between the host terminal 1401 and the disc volume 1211.

By using the configuration, processing, data examples explained with reference to FIG. 2, FIG. 3, FIG. 4, and FIG. 5, what is required for band guarantee between a storage region of a storage device connected to the network and an information device using the region can be automatically set and adjusted instead of the work performed by a setting person, i.e., checking the configuration information and performance information of the storage device, checking all the band control settings between the storage regions present in the storage device and the information device using the storage regions, and setting it on a network repeater device to see whether an expected band guarantee is realized.

Moreover, when configuration of the storage device connected to the network or configuration of an information device using the storage region in the storage device is modified, it is possible to automatically modify and update the setting concerning the band control of the network repeater device for performing band guarantee between the storage region of the storage device connected to the network and the information device using the storage region in the storage device.

FIG. 6 shows a network configuration according to a second embodiment of the present invention.

The setting terminal is different in that a storage device information automatic acquisition block 1021 is provided in addition to the band guarantee specification block 1011. Moreover, in the first embodiment, the storage device 1201 includes the band guarantee requirement storage block 1231 including the band guarantee requirement data 1232 and the band control information creation block 1251 while in the second embodiment, the band guarantee requirement storage block 1231 and the band control information creation block 1251 are provided in the setting terminal.

When a setting person specifies the priority relationship between a plurality of disc volumes 1211 existing in the storage device 1201 and the priority ratio condition of a plurality of host terminals 1401 using the disc volumes 1211, through the band guarantee specification block 1011 in the setting terminal 1001, the information is stored as the band guarantee requirement data 1232 of the band guarantee requirement storage block 1231 similarly as in FIG. 2 of the host terminal 1401.

On the other hand, as has been explained with reference to FIG. 2, the storage device configuration/performance information data 1242 managed by the storage device information management block 1241 in the storage device 1201 is periodically acquired by the storage device information automatic acquisition block 1021 via the setting network 1031. Similarly as in FIG. 2, the acquired information is combined with the band guarantee requirement data 1232 and used by the band control information creation block 1251 so as to create a condition for band control by the network repeater device 1101, the rest of processing, configuration, and data contents are identical to those of FIG. 2. It should be noted that the program for functioning as components of the setting terminal 1001 is recorded in a recording medium such as a CD-ROM and stored on a magnetic disc and then loaded on a memory to be executed. It should be noted that the medium recording the program may be a recording medium other than the CD-ROM. Moreover, the program may be installed from the recording medium to the setting terminal 1001 or the program may be used by accessing the storage medium via a network.

With the configuration, processing, and data explained with reference to FIG. 6, it is possible to obtain an effect similar to the first embodiment. Furthermore, in the second embodiment, it becomes possible to manage the storage device configuration/performance information data 1242 of a plurality of storage devices 1201 and accordingly, it becomes possible to control to realize the band guarantee for the host terminals 1401 commonly connected between the storage devices 1201.

As has been described above, according to the present invention, the network repeater device performs the band guarantee between the storage region of the storage device connected to a network and a network of the information device using the aforementioned storage region. Accordingly, it becomes possible to automatically create the band control information and make adjustment, so as to replace what has been manually performed by a setting person, i.e., checking the configuration information and performance information in the storage device and setting it on the network repeater device to determine whether an expected band guarantee is realized.

Furthermore, when the configuration of the storage device connected to a network or connection relationship with the information device using the storage region of the storage device is modified, it is possible to automatically modify/ update the setting concerning the band control of the network repeater device for performing the band guarantee between the storage region of the storage device connected to a network and the information device using the region.

Moreover, when a plurality of storage devices are connected to a network and an information device commonly connected to the storage devices is present, in the same way as the case when only one storage device is present, it is possible to automatically create the band control information of the network repeater device and adjust it.

According to the present invention, it is possible to guarantee control of the communication band in a network system including a storage device and plurality of information devices using storage regions of the storage device.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A network system connected to a storage device and a plurality of information devices using storage regions of the storage device which includes at least one network port and at least one disk volume, the storage device being connected to the network system via the at least one network port, the network system comprising a band control instruction apparatus including:

a band control information creation unit for creating band control information for performing network communication band control of a communication path between an information device and a network port of the storage device in accordance with band guarantee requirement information indicating a communication condition to be guaranteed on the communication path, configuration information indicating a connection between the network port and a disk volume in the storage device and indicating a connection between the information device and the disk volume, and performance information of the network port and the disk volume in the storage device, and an instruction unit for instructing a band control execution device, coupled between the information device and the storage device in the network system, to execute the network communication band control of the communication path in accordance with the band control information received from the band control information creation unit, wherein the band control information creation unit judges whether the band control information created by the band control information creation unit causes the guaranteed communication condition to be satisfied by comparing information including the configuration information and the performance information to the band guarantee requirement information, and wherein if the band control information created by the band control information creation unit does not cause the guaranteed communication condition to be satisfied, the band control information is changed by re-creating new band control information by the band control information creation unit.

2. The network system as claimed in claim 1, wherein the band control instruction apparatus further includes an acquisition unit for acquiring the configuration information and the performance information.

3. The network system as claimed in claim 1, wherein the band control information creation unit of the band control instruction apparatus creates the band control information when the configuration of the storage device or the network connection relationship is modified.

4. A storage apparatus connected via a network to a plurality of information devices, the storage apparatus comprising:

at least one network port;

at least one disk volume, wherein the storage apparatus is connected to the network via the at least one network port;

a band control information creation unit for creating band control information for performing network communication band control of a communication path between an information device and a network port of the storage apparatus in accordance with band guarantee requirement information indicating a communication condition to be guaranteed on the communication path, configuration information indicating a connection between the network port and a disk volume in the storage apparatus and indicating a connection between the information device and the disk volume, and performance information of the network port and the disk volume in the storage apparatus, and an instruction unit for instructing a band control execution device, coupled between the information device and the storage apparatus in the network, to execute the network communication band control of the communication path in accordance with the band control information received from the band control information creation unit, wherein the band control information creation unit judges whether the band control information created by the band control information creation unit causes the guaranteed communication condition to be satisfied by comparing information including the configuration information and the performance information to the band guarantee requirement information, and wherein if the band control information created by the band control information creation unit does not cause the guaranteed communication condition to be satisfied, the band control information is changed by re-creating new band control information by the band control information creation unit.

5. A band control apparatus for executing communication band control in a network system connected to a storage device and a plurality of information devices using storage regions of the storage device which includes at least one network port and at least one disk volume, the storage device being connected to the network system via the at least one network port, the band control apparatus comprising:

a band control information creation unit for creating band control information for performing network communication band control of a communication path between an information device and a network port of the storage device in accordance with band guarantee requirement information indicating a communication condition to be guaranteed on the communication path, configuration information indicating a connection between the network port and a disk volume in the storage device and indicating a connection between the information device and the disk volume and performance information of the network port and the disk volume in the storage device; and a band control execution unit, coupled between the information device and the storage device, for executing the network communication band control of the communication path in accordance with the band control information received from the band control information creation unit, wherein the band control information creation unit judges whether the band control information created by the band control information creation unit causes the guaranteed communication condition to be satisfied by comparing information including the configuration information and the performance information to the band guarantee requirement information, and wherein if the band control information created by the band control information creation unit does not cause the guaranteed communication condition to be satisfied, the band control information is changed by re-creating new band control information by the band control information creation unit.

6. A network relay apparatus for controlling connection relationship of a network system connected to a storage device and a plurality of information devices using storage regions of the storage device which includes at least one network port and at least one disk volume, the storage device being connected to the network system via the at least one network port, the network relay apparatus comprising:

a band control information creation unit for creating band control information for performing network communication band control of a communication path between an information device and a network port of the storage device in accordance with band guarantee requirement information indicating a communication condition to be guaranteed on the communication path, configuration information indicating a connection between the network port and a disk volume in the storage device and indicating a connection between the information device and the disk volume, and performance information of the network port and the disk volume in the storage device, and a band control execution unit, coupled between the information device and the storage device, for executing the network communication band control of the communication path in accordance with the band control information received from the band control information creation unit, wherein the band control information creation unit judges whether the band control information created by the band control information creation unit causes the guaranteed communication condition to be satisfied by comparing information including the configuration information and the performance information to the band guarantee requirement information, and wherein if the band control information created by the band control information creation unit does not cause the guaranteed communication condition to be satisfied, the band control information is changed by re-creating new band control information by the band control information creation unit.

7. A recording medium containing a program for causing a band control instruction apparatus to execute a communication band control instruction in a network system connected to a storage device which includes at least one network port and at least one disk volume, the storage device being connected to the network system via the at least one network port and a plurality of information devices using storage regions of the storage device, the program causing the band control instruction apparatus to execute:

a procedure to create band control information required for performing network communication band control of a communication path between an information device and a network port of the storage device in accordance with band guarantee requirement information indicating a communication condition to be guaranteed on the communication path, configuration information indicating a connection between the network port and a disk volume in the storage device and indicating a connection between the information device and the disk volume, and performance information of the network port and the disk volume in the storage device, and a procedure to execute the network communication band control of the communication path in accordance with the band control information received from the band control information creation unit, wherein the procedure to create band control information includes judging whether the created band control information causes the guaranteed communication condition to be satisfied by comparing information including the configuration information and the performance information to the band guarantee requirement information, and wherein if the created band control information does not cause the guaranteed communication condition to be satisfied, the band control information is changed by re-creating new band control information by the procedure to create band control information.

8. A recording medium containing a program for causing a band control apparatus to execute a communication band control in communication in a network system connected to a storage device which includes at least one network port and at least one disk volume, the storage device being connected to the network system via the at least one network port and a plurality of information devices using storage regions of the storage device, the program causing the band control apparatus to execute:

a procedure to create band control information required for performing network communication band control of a communication path between an information device and a network port of the storage device in accordance with band guarantee requirement information indicating a communication condition to be guaranteed on the communication path, configuration information indicating a connection between the network port and a disk volume in the storage device, and performance information of the network port and the disk volume in the storage device; and a procedure to execute the network communication band control of the communication path in accordance with the band control information received from the band control information creation unit, wherein the procedure to create band control information includes judging whether the created band control information causes the guaranteed communication condition to be satisfied by comparing information including the configuration information and the performance information to the band guarantee requirement information, and wherein if the created band control information does not cause the guaranteed communication condition to be satisfied, the band control information is changed by re-creating new band control information by the procedure to create band control information.

9. A communication band control instruction method for a network system connected to a storage device which includes at least one network port and at least one disk volume, the storage device being connected to the network system via the at least one network port and a plurality of information devices using storage regions of the storage device, the communication band control instruction method comprising steps of:

creating band control information required for performing network communication band control of a communication path between an information device and a network port of the storage device in accordance with band guarantee requirement information indicating a communication condition to be guaranteed on the communication path, configuration information indicating a connection between the network port and a disk volume in the storage device, and performance information of the network port and the disk volume in the storage device, and executing the network communication band control of the communication path in accordance with the band control information received from the band control information creation unit, wherein the step of creating band control information includes judging whether the created band control information causes the guaranteed communication condition to be satisfied by comparing information including the configuration information and the performance information to the band guarantee requirement information, and wherein if the created band control information does not cause the guaranteed communication condition to be satisfied, the band control information is changed by re-creating new band control information by the procedure to create band control information.

10. A communication band control method for a network system connected to a storage device which includes at least one network port and at least one disk volume, the storage device being connected to the network system via the at least one network port and a plurality of information devices using storage regions of the storage device, the communication band control method comprising steps of:

creating band control information required for performing network communication band control of a communication path between an information device and a network port of the storage device in accordance with band guarantee requirement information indicating a communication condition to be guaranteed on the communication path, configuration information indicating a connection between the network port and the disk volume in the storage device, and performance information of the network port and disk volume in the storage device, and executing the network communication band control of the communication path in accordance with the band control information received from the band control information creation unit, wherein the step of creating band control information includes judging whether the created band control information causes the guaranteed communication condition to be satisfied by comparing information including the configuration information and the performance information to the band guarantee requirement information, and wherein if the created band control information does not cause the guaranteed communication condition to be satisfied, the band control information is changed by re-creating new band control information by the procedure to create band control information.

11. In a computer system including plurality of computers, a storage apparatus with plurality of disk volumes each of which is requested to input/output from said computers, and with plurality of network ports each of which is related to the disk volumes and a switch coupled to the computers via a first network and the storage apparatus via a second network, a method for managing bandwidth of the first network and the second network for the switch, said method comprising the steps of:

receiving request information for access performance of accessing disk volumes including a disk of first priority among the disk volumes, a disk of second priority among the disk volumes and priority of access sources for each disk volume;

acquiring performance information including access performance of accessing disk volumes for the storage apparatus and communication performance of communicating through the network ports for the storage apparatus;

calculating communication performance to be assigned to each of the network ports and access performance to be assigned to each of the disk volumes based on the request information and the performance information;

comparing the calculated communication performance and the calculated access performance to determine which is lower;

creating band control information with a lower value of either the calculated communication performance or the calculated access performance;

setting bandwidth for a data path between a host computer and a network port to the switch based on the band control information;

judging whether the band control information causes a guaranteed communication condition to be satisfied by comparing information including configuration information and the performance information to band guarantee requirement information; and if the band control does not cause the guaranteed communication condition to be satisfied, changing the band control information by re-creating new band control information.

12. A network system connected to a storage device and a plurality of information devices using storage regions of the storage device which includes at least one network port and at least one disk volume, the storage device being connected to the network system via the network port, the network system comprising a band control instruction apparatus including:

a band control information creation unit for receiving request information for access performance of accessing disk volumes including a disk of first priority among the disk volumes, a disk of second priority among the disk volumes and priority of access sources for each disk volume, acquiring performance information including access performance of accessing disk volumes for the storage apparatus and communication performance of communicating through the network ports for the storage apparatus, calculating communication performance to be assigned to each of the network ports and access performance to be assigned to each of the disk volumes based on the request information and the performance information, comparing the calculated communication performance and the calculated access performance to determine which is lower, and creating band control information with a lower value of either the calculated communication performance or the calculated access performance; and an instruction unit for instructing a band control execution device, coupled between the information devices, to set bandwidth for a data path between a host computer and a network port to the switch based on the band control information, wherein said band control information creation unit which judges whether the band control information causes a guaranteed communication condition to be satisfied by comparing information including configuration information and the performance information to the band guarantee requirement information, and if the band control does not cause the guaranteed communication condition to be satisfied, changes the band control information by re-creating new band control information.

13. A storage apparatus connected via a network to a plurality of information devices, the storage apparatus comprising:

at least one network port;

at least one disk volume, wherein the storage apparatus is connected to the network via the at least one network port;

a band control information creation unit for receiving request information for access performance of accessing disk volumes of the storage apparatus including a disk of first priority among the disk volumes, a disk of second priority among the disk volumes and priority of access sources for each disk volume, acquiring performance information including access performance of accessing the disk volumes of the storage apparatus and communication performance of communicating through the at least one network port for the storage apparatus, calculating communication performance to be assigned to each of the at least one network port and access performance to be assigned to each of the disk volumes based on the request information and the performance information, comparing the calculated communication performance and the calculated access performance to determine which is lower, and creating band control information with a lower value of either the calculated communication performance or the calculated access performance; and an instruction unit for instructing a band control execution device, coupled between an information device and the storage apparatus, to set bandwidth for a data path between the information device and a network port of the storage apparatus based on the band control information, wherein said band control information creation unit judges whether the band control information causes a guaranteed communication condition on the data path to be satisfied by comparing information including configuration information of the storage apparatus and the performance information to band guarantee requirement information, and if the band control information does not cause the guaranteed communication condition to be satisfied, changes the band control information by re-creating new band control information.

14. A band control apparatus for executing communication band control of a network system connected to a storage device and a plurality of information devices using storage regions of the storage device which includes at least one network port and at least one disk volume, the storage device being connected to the network system via the at least one network port, the band control apparatus comprising:

a band control information creation unit for receiving request information for access performance of accessing disk volumes of the storage device including a disk of first priority among the disk volumes, a disk of second priority among the disk volumes and priority of access sources for each disk volume, acquiring performance information including access performance of accessing the disk volumes of the storage device and communication performance of communicating through the at least one network port for the storage device, calculating communication performance to be assigned to each of the at least one network port and access performance to be assigned to each of the disk volumes based on the request information and the performance information, comparing the calculated communication performance and the calculated access performance to determine which is lower, and creating band control information with a lower value of either the calculated communication performance or the calculated access performance; and an instruction unit for instructing a band control execution device, coupled between an information device and the storage device, to set bandwidth for a data path between the information device and a network port of the storage device based on the band control information, wherein said band control information creation unit judges whether the band control information causes a guaranteed communication condition on the data path to be satisfied by comparing information including configuration information of the storage apparatus and the performance information to band guarantee requirement information, and if the band control information does not cause the guaranteed communication condition to be satisfied, changes the band control information by re-creating new band control information.

* * * * *